(12) United States Patent
Ma et al.

(10) Patent No.: US 10,715,274 B2
(45) Date of Patent: Jul. 14, 2020

(54) CHANNEL WIDTH AGILE COMMUNICATION METHOD

(71) Applicant: Guangdong University of Technology, Guangzhou (CN)

(72) Inventors: Jianguo Ma, Guangzhou (CN); Shaohua Zhou, Guangzhou (CN); Hengyue Jin, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 16/266,065

(22) Filed: Feb. 3, 2019

(65) Prior Publication Data

US 2020/0028610 A1   Jan. 23, 2020

(30) Foreign Application Priority Data

Jul. 18, 2018   (CN) .......................... 2018 1 0790702

(51) Int. Cl.
| | |
|---|---|
| *H04L 1/00* | (2006.01) |
| *H04W 12/00* | (2009.01) |
| *H04B 1/715* | (2011.01) |
| *H04L 1/02* | (2006.01) |
| *H04L 29/06* | (2006.01) |

(52) U.S. Cl.
CPC .......... *H04L 1/0009* (2013.01); *H04B 1/715* (2013.01); *H04L 1/02* (2013.01); *H04W 12/001* (2019.01); *H04B 2001/7154* (2013.01); *H04L 63/0464* (2013.01)

(58) Field of Classification Search
CPC ...................................................... H04L 1/0009
USPC ........................................................ 375/133
See application file for complete search history.

(56) References Cited

U.S. PATENT DOCUMENTS

| | | | | |
|---|---|---|---|---|
| 5,586,120 A | * | 12/1996 | Cadd .................... | H04B 1/7143 370/329 |
| 7,852,147 B1 | * | 12/2010 | Mirzaei .............. | H03H 11/1291 327/552 |
| 2002/0159426 A1 | * | 10/2002 | Kanemoto ................ | H04L 5/06 370/342 |

* cited by examiner

Primary Examiner — Lihong Yu

(57) ABSTRACT

The present disclosure relates to a communication method related with channel width agile. The method uses a channel generation circuit at a signal transmitting end to generate a channel whose channel width can be changed according to a certain law, and a channel detection circuit at a signal receiving end corresponding thereto to detect the corresponding channel width by the same channel width agile law, thereby achieving the secure reception of the signal. Due to the agility of the channel width, communication security is ensured, and it does not conflict with other technologies (such as frequency hopping), and the channel width can be dynamically allocated. In this way, the advantages of high security, compatibility, and high spectrum utilization can be achieved. Meanwhile, the method realizes the maximum possible optimization of the channel and is very creative.

8 Claims, 3 Drawing Sheets

CHANNEL WIDTH AGILE COMMUNICATION METHOD

CROSS-REFERENCE TO RELATED APPLICATION

This application claims the priority to Chinese Patent Application No. 201810790702.2 filed on Jul. 18, 2018. The content of the aforementioned application, including any intervening amendments thereto, are incorporated herein by reference.

TECHNICAL FIELD

The disclosure relates to a secure communication method with channel width agility, in particular to a channel width agile communication method.

TECHNICAL BACKGROUND

The development of human society has lasted for thousands of years during which it has accumulated brilliant human civilization. In the development of human civilization, the communication between persons is the necessary condition and medium for the emergence and development of civilization. With the rapid development of science and technology, the way of communication between persons has been passed from the beginning of oral communication to the transmission of information through paper and other materials, and to the communication of sending messages using telegraph machines. The communication such as the telephone and mobile communication has greatly accelerated the development of human civilization.

With the advancement and development of communication technology, a variety of communication technologies and communication means are emerging. In addition to the purpose of transmitting information better and faster, its main purpose is to provide safe and reliable information exchange and information interaction. In particular, the radio communication and optical communication technologies, which use different frequencies to carry different information to achieve the interaction of a large amount of information, has rapid development. It is desired that the security of information transmission can be ensured while a large amount of information is transferred quickly. Therefore, ensuring information security has become the theme of the times. Over time, communication security technologies based on radio communications and optical communications are changing rapidly.

Secure communication means currently used can basically be divided into two categories: one is to encrypt a carrier frequency, i.e. using the so-called "frequency hopping": that is, within a certain spectrum range, carrier communication is not carried out using a fixed radio frequency or optical frequency, but is carried out alternately using different frequencies according to a pre-planned law of frequency variation. This makes it impossible for the third party to grasp the actual communication frequency, thus achieving more secure communication. Furthermore, this kind of security technology has been invented by Heidi Rama for nearly 80 years, and the technology is quite mature. In addition to encryption, it can also play a good anti-interference effect to a certain extent. Moreover, if the frequency hopping rate is higher (such as hopping thousands of times per second, that is, the dwell time at each frequency point is in milliseconds), the more complicated the "frequency hopping pattern" is, the more secure the communication is. Because of these characteristics, it is widely used in aspects of military communications and electronic countermeasures etc. Another way of secure communication is to perform encryption processing on a digital baseband portion, i.e., implement secure communication by using complex digital coding of the original information. In practical applications, in order to make communication more secure, in many cases, frequency hopping and encoding are used simultaneously, thereby increasing the difficulty of cracking to improve confidentiality and security. However, regardless of which existing secure communication method (such as conventional frequency hopping and adaptive frequency hopping of frequency hopping technology, digital cryptography, etc.) is used, the channel bandwidth occupied by the communication channel is fixed. In this way, even if the security means of the frequency hopping plus baseband digital coding is used, the frequency hopping spectrum of a certain fixed channel width can be received and acquired by a spectrum analyzer. According to the obtained frequency hopping spectrum, the transmitted encoded signal can be obtained, and can be then repeatedly cracked by a mainframe computer using various decryption algorithms. It is possible to crack the used codes for obtaining the transferred information.

The core of the present disclosure is to implement secure communication by using a modified channel circuit to make the communication channel width dynamically agile on the basis of the foregoing two. It is completely different from the existing principle of secure communication and is a new principle of secure communication.

Since there is currently no instrument similar to the spectrum scanning and monitoring spectrum to scan the monitoring channel width agility, the present disclosure provides another basic secure communication means.

SUMMARY

In view of this, an object of embodiments of the present disclosure is to provide a channel width agile communication method, which solves the security and reliability of communication, strengthens anti-interference, and ensures the secure transmission of information. Also, the channel agile spectrum realizes the technical problem of the channel's maximum possible optimization.

The technical solution adopted by the embodiments of the present disclosure to solve the above technical problem is as follows:

According to an aspect of an embodiment of the present disclosure, a channel width agile communication method is provided:

The implementation of the method comprises steps of:

step 1 (S101): at analog/Radio Frequency (RF) transmitting end of a wireless communication system, analog-to-digital converting original signal to digital signal, and then channel-encoding it to increase redundancy and reduce errors, and then immediately modulating it into transmission symbol, and then transmitting communication information;

step 2 (S102): by means of a channel generation circuit provided at the analog/RF transmitting end of the wireless communication system, generating a channel with a variable channel width, changing the channel width occupied by the transmitted information according to a variation law, wherein the variation law of said channel width is a channel agile spectrum, said channel agile spectrum is used to perform a first encryption on the communication information, and then a frequency hopping is used to perform a second encryption thereon; and then transmitting the information encrypted by the channel agile spectrum and the frequency hopping through the analog/RF transmitting end of the wireless communication system, and then transmitting it to an analog/RF receiving end of the wireless communication system through air or other medium;

step 3 (S103): by means of a channel detection circuit provided at the analog/RF receiving end of the wireless communication system, detecting the channel width corresponding to the transmitted information, and then generating a receiving channel with a corresponding width;

step 4 (S104): receiving the communication information according to the channel agile spectrum determined by two parties, then identifying the processed signal by means of demodulation and decoding, and finally obtaining the information transmitted from the other party.

Preferably, in steps 2 and 3, the channel agile spectrum is generated by the channel generation circuit and the channel detection circuit, varied according to a certain law, and the channel widths of the source and the sink are synchronized in time in a way similar to the frequency hopping, so a synchronous transmission and reception is achieved and a secure communication is realized, i.e. the first encryption, because there is currently no monitoring device that monitors the channel width agility. Moreover, the channel widths of receiving and transmitting systems of the current communication equipment are fixed. Therefore, the channel width agile method can be used to generate a signal whose channel width changes according to a certain law by the channel generation circuit at the transmitting end, and the corresponding signal is detected according to the same law for the channel detection circuit at the receiving end. This ensures the secure transmission of information.

Preferably, after the first encryption, the baseband signal is modulated, and after the processing is completed, a carrier frequency wave is encrypted by using the frequency hopping, that is, the carrier frequency of the signal changes with time over a certain frequency band width according to a certain law, so that the second encryption is performed. Due to the variable frequency of the carrier frequency wave of the frequency-hopping, it will undoubtedly greatly enhance the security and reliability of communication, and can also enhance the anti-interference.

Preferably, in step 2, the channel of the channel agile spectrum changes according to a certain spectrum, a wide channel is allocated for the segments of a large information stream, and a relatively narrow channel is adopted to transmit for the segments of a small information stream, achieving the most possible optimal use of the channel.

Preferably, in step 4, the signal arrives at the receiving end, and the same channel width as the channel generation circuit at the transmitting end is generated by the channel detection circuit at the receiving end according to the channel agile spectrum determined by the two parties in advance, and after receiving the signal, the processed signal is identified by means of demodulation and decoding according to an agile signal of carrier synchronization, bit synchronization, and frame synchronization characteristics, and finally the information transmitted from the other party is obtained. Moreover, the channel width is changed synchronously to receive signals over time, and a technology that the channel widths of the receiving and transmitting ends can be agile is implemented by changing the channel generation circuit at the transmitting end and the channel detection circuit at the receiving end, which makes only the communicators know the variation law of the channel width themselves, greatly improving the security of communication.

Preferably, when the channel width is fixed, the agility of the channel agile spectrum is a special case, namely the change of the agile spectrum with time is zero, so the channel agile method is fully compatible with existing fixed channel communication methods.

In the present disclosure, the improved channel generation circuit can make the channel width of the transmitting end agilely change according to a certain law, i.e. the channel agile spectrum, and at the same time the channel detection circuit at the receiving end detects the corresponding signal according to the same law. Also, the variable frequency of the carrier frequency wave of the frequency hopping technology greatly enhances the security and reliability of the communication, and can also enhance the anti-interference, thereby ensuring the secure transmission of information, and achieving the maximum possible optimization of the channel.

The implementation, functional features and advantages of the present disclosure will be further described with reference to the accompanying drawings.

DETAILED DESCRIPTION

In order to make the technical problems to be solved by the present disclosure, technical solutions and beneficial effects clearer, the present disclosure will be further described in detail with reference to the accompanying drawings and embodiments. It should be understood that specific embodiments described herein are only used to explain the present disclosure and are not intended to limit the present disclosure.

The embodiment of the present disclosure provides a channel width agile security method, which is based on the variable channel width 107 occupied when transmitting information 108, and breakthroughs the barrier of the channel width 107 inherent in each specific transmission mode of the original communication, thereby performing encrypted communication.

The implementation of the secure communication method of the present disclosure is mainly based on a channel generation circuit 105 and a channel detection circuit 106 at a transmitting end and a receiving end, and the specific process has the following steps:

An original signal at the transmitting end is analog-to-digital converted to a digital signal, and then channel-encoded to increase redundancy to reduce errors, followed by modulation into transmission symbols (such as BPSK, QPSK, 64-QAM, etc.).

The channel generation circuit 105 changes the width of the transmission channel according to a certain law, and transmits the signal to a medium at the RF transmitting end.

The channel detection circuit 106 at the receiving end detects the corresponding channel width to receive the information transmitted from the transmitting end.

The digital signal is converted into an analog signal through channel decoding and decompression at the receiving end, thereby obtaining an original signal close to the transmitting end.

Figure 1:
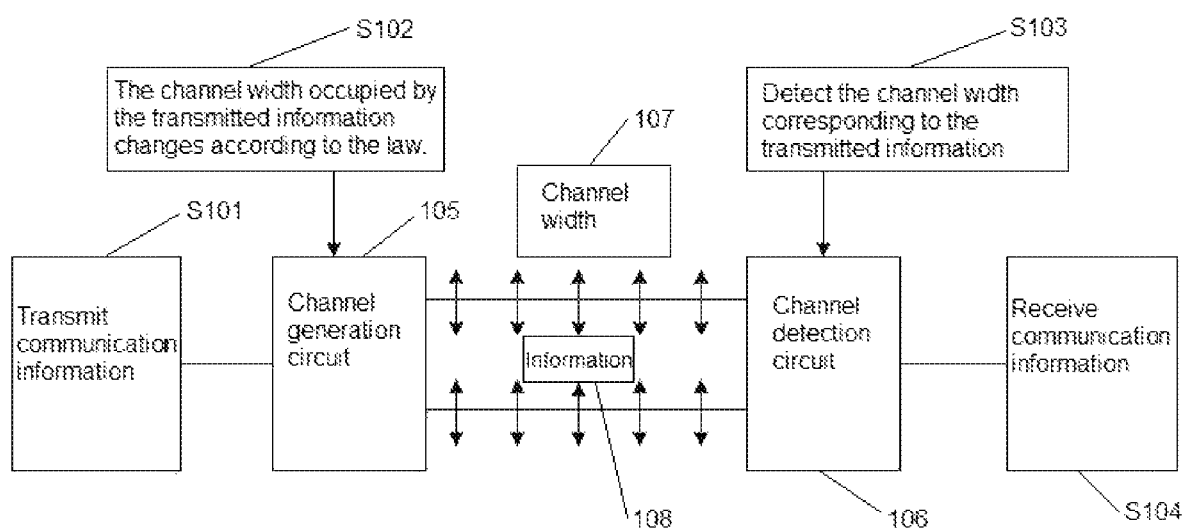
FIG. 1 is a block diagram of an implementation process of a channel width agile security method of the present disclosure.

The implementation process of the present disclosure is mainly the following process:

FIG. 1 is a schematic diagram of an implementation process of a channel width agile security method. Referring to FIG. 1, the communication makes a regular change in the channel width 107 according to the user's request by using the channel generation circuit 105 before the information 108 is transmitted from a terminal at the transmitting end, and then the information is transmitted. A user at the receiving end contacts a user at the transmitting end in advance to obtain the change law of the channel width 107. Thus, in time and space, the channel detection circuit 106 generates channels of the same width for reception of information. Thus, a complete communication is completed.

Compared to the inherent communication security technology, whether it is frequency hopping or coding technology, the channel width 107 of signal transmission is fixed due to the communication device and the technology itself. In actual communication encryption, even if the communication is encrypted at the same time by using frequency hopping and encoding, the frequency hopping spectrum can be monitored by a monitoring device such as a spectrum analyzer to perform decoding to obtain communication information. This is dangerous because the communication message may be stolen. However, the channel width agile communication method is secure because there is currently no monitoring device for monitoring the channel width agility. Moreover, the channel widths 107 of receiving and transmitting systems of the current communication equipment are fixed. Therefore, the channel width agile method can be used to generate a signal whose channel width changes according to a certain law by the channel generation circuit 105 at the transmitting end, and the corresponding signal is detected according to the same law for the channel detection circuit 106 at the receiving end. This ensures the secure transmission of information.

In terms of specific applications, a channel agile chip module 202 developed by our R&D team can realize the agile change of the channel. The specific situation is to achieve agile change of arbitrary width of 5 KHz-2 MHz channels, and the chip is highly integrated (9 mm×8 mm), with low power consumption and high sensitivity, and supports for multiple modulation means. Meeting the requirements of industrialization and commercialization can greatly improve the quality of our communication.

The data rate to be transmitted in actual communication is not constant, but varies dynamically with content. For example, for two persons talking on the phone, when a person speaks, the amount of information that the person who listens to the phone needs to transmit is much smaller than the amount of information of the person who speaks. However, the current system is that the two parties occupy the same channel, resulting in the waste of the channel spectrum. When a video stream needs to be transmitted, the amount of information contained in each segment of the video stream is different. However, the current communication system still allocates a fixed channel, and the same fixed channel is used when a video segment of a large information stream is encountered and when the amount of information to be transmitted is small. This results in a channel width that is not enough for large information streams and becomes a waste of capability on a petty job for small information stream segments. If the channel agility method of the present disclosure is employed, the channel changes according to a certain agile spectrum. A wide channel is allocated for segments of a large information stream, and a relatively narrow channel is used for segments of a small information stream. The maximum possible optimization of the channel is realized, and the present disclosure has extremely important significance under the current situation that the wireless spectrum is in seriously shortage.

Figure 2:
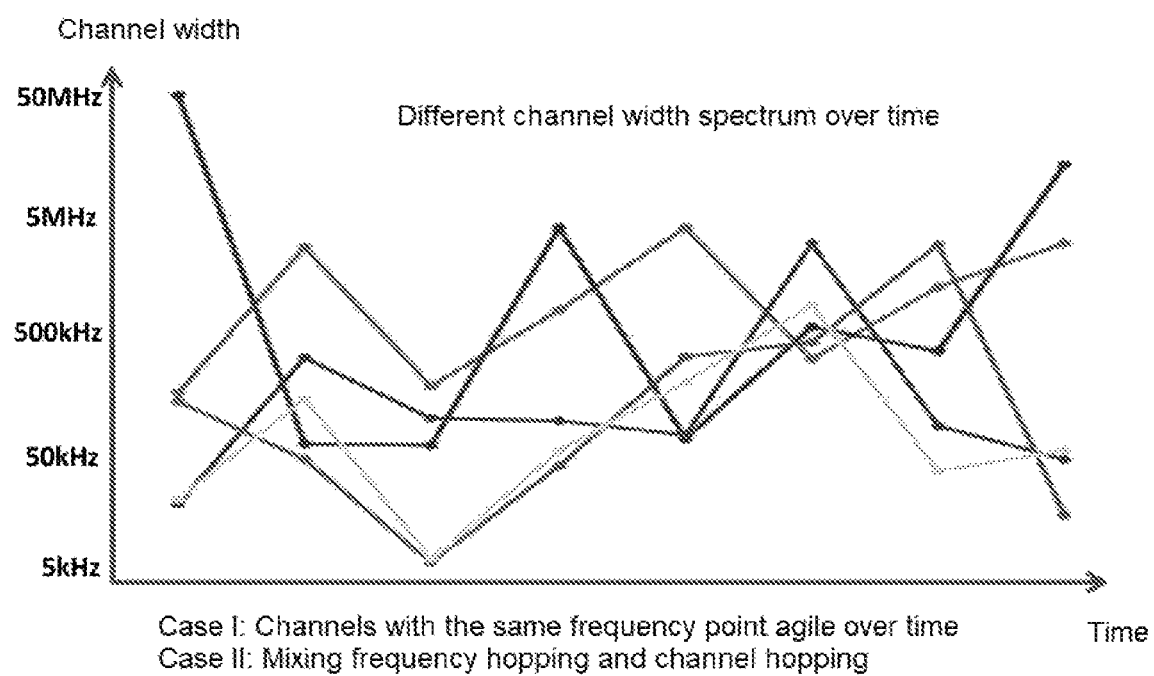
FIG. 2 is a diagram of a channel spectrum of the channel width agile security method of the present disclosure as a function of time.
Figure 3:
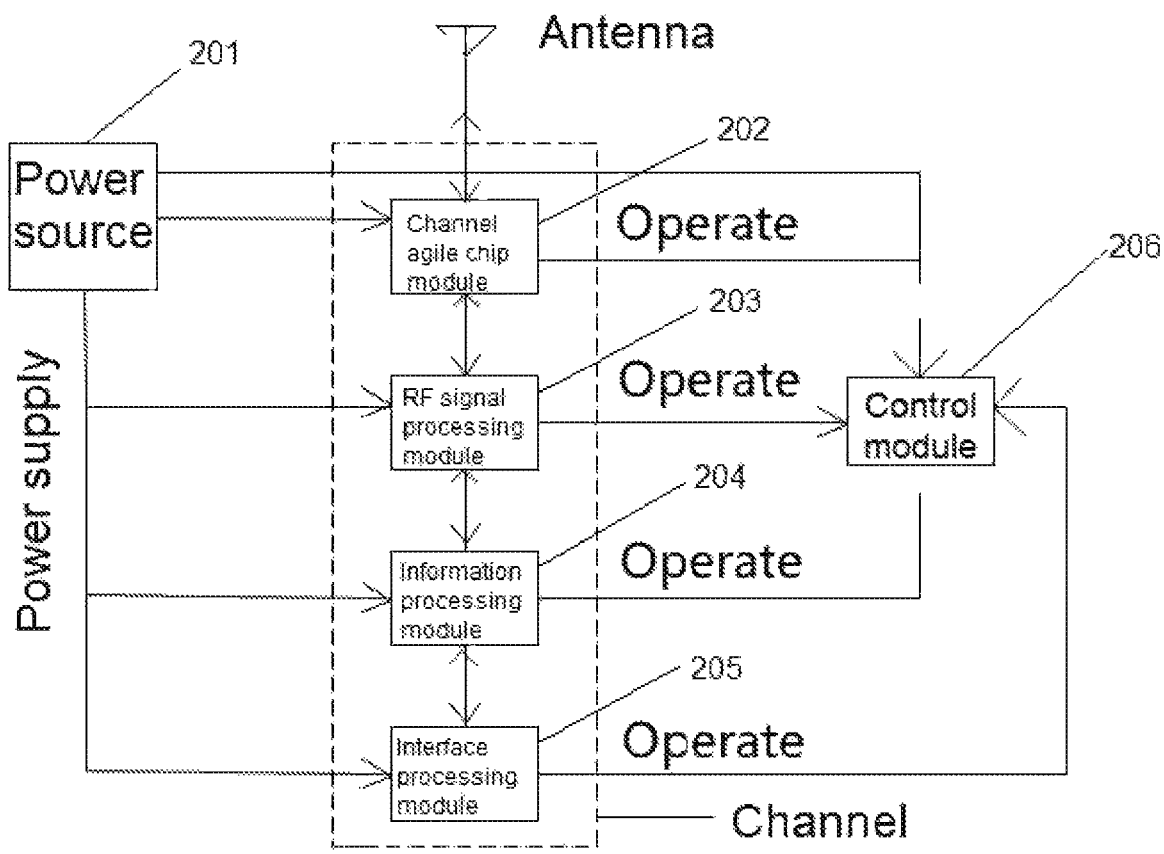
FIG. 3 is a schematic diagram of the channel width agile security system of the present disclosure for constructing a communication radio station.

More importantly, the channel width agile method does not conflict with the frequency hopping technology, because one of them changes the channel width 107 according to a certain law, and the other is to change the frequency of the carrier frequency wave according to a certain law. If there is the same point, then the channel width 107 of the channel width agile method and the frequency of the carrier frequency wave of the frequency hopping are all changed according to a certain law. Thus, the two methods can be used in parallel. If the advantages of the variable channel width of the channel width agile secure communication method and the variable frequency of the carrier frequency wave of the frequency hopping technique are applied, the security and reliability of the communication will be greatly enhanced, and the anti-interference can be enhanced. When the channel width 107 is fixed, it can be considered as a special case of agility: the change of the agile spectrum with time is zero. Therefore, it can demonstrate the full compatibility of the channel agility method with existing fixed channel communication methods. In detail, refer to the example shown in FIG. 2 where the channel agile spectrum changes with time; for case 1, the channel agility method can be used alone, that is, at the same frequency point, the channel width changes with time; for case 2, when communicating, it is possible to perform frequency hopping and "jumping channel" at the same time to achieve double insurance. In a more specific application, it can be applied in the radio communication architecture shown in FIG. 3, and the channel agile chip module 202 is embedded in the radio communication to realize the "jump channel" secure communication of the device. Of course, this "jumping channel" combined with frequency hopping can further ensure the security and robustness of the signal.

The preferred embodiments of the present disclosure have been described above with reference to the accompanying drawings, and are not intended to limit the scope of the present disclosure. Any modifications, equivalent substitutions and improvements made by those skilled in the art without departing from the scope and spirit of the present disclosure are intended to be included within the scope of the present disclosure.

The invention claimed is:

1. A channel width agile and secure communication method, comprising:
   step 1 (S101): at analog/Radio Frequency (RF) transmitting end of a wireless communication system, analog-to-digital converting original signal to digital signal, and then channel-encoding the digital signal to increase redundancy and reduce errors, and then immediately modulating the encoded digital signal into transmission symbol, and then transmitting communication information;
   step 2 (S102): by means of a channel generation circuit provided at the analog/RF transmitting end of the wireless communication system, generating a channel with a variable channel width, changing the channel width occupied by the transmitted information according to a variation law, wherein the variation law of the channel width is a channel agile spectrum, i.e., a variable channel spectrum, the channel agile spectrum is used to perform a first encryption on the communication information, and then a frequency hopping is used to perform a second encryption thereon; and then transmitting the information encrypted by the channel agile spectrum and the frequency hopping through the analog/RF transmitting end of the wireless communication system, and then transmitting it to an analog/RF receiving end of the wireless communication system through air or other transmitting end medium;

step 3 (S103): by means of a channel detection circuit provided at the analog/RF receiving end of the wireless communication system, detecting the channel width corresponding to the transmitted information, and then generating a receiving channel with a corresponding width;

step 4 (S104): receiving the communication information according to the channel agile spectrum determined by two parties in advance, then identifying the processed signal by means of demodulation and decoding, and finally obtaining the information transmitted from the other party.

2. The channel width agile and secure communication method according to claim 1, wherein in steps 2 and 3, the channel agile spectrum is generated by the channel generation circuit and the channel detection circuit, varied according to a law, and the channel widths of a source and a sink are synchronized in time in a way similar to the frequency hopping, so a synchronous transmission and reception is achieved and a secure communication is realized, which is the first encryption.

3. The channel width agile and secure communication method according to claim 2, wherein after the first encryption, a baseband signal is modulated, after the modulation, a carrier frequency wave is encrypted by using the frequency hopping, that is, the carrier frequency of the signal changes with time over a certain frequency band width according to a law, so that the second encryption is performed, and an anti-interference effect is exerted.

4. The channel width agile and secure communication method according to claim 2, wherein in step 2, the channel of the channel agile spectrum changes according to a spectrum, a wide channel is allocated to transmit segments of a large information stream, and a narrow channel is allocated to transmit segments of a small information stream.

5. The channel width agile and secure communication method according to claim 1, wherein in step 2, the channel of the channel agile spectrum changes according to a spectrum, a wide channel is allocated to transmit segments of a large information stream, and a narrow channel is allocated to transmit segments of a small information stream.

6. The channel width agile and secure communication method according to claim 1, wherein in step 3, the signal arrives at the receiving end, and the same channel width as the channel generation circuit at the transmitting end is generated by the channel detection circuit at the receiving end according to the channel agile spectrum agreed by the two parties and the channel width changes synchronously over time to receive the signal.

7. The channel width agile and secure communication method according to claim 6, wherein in step 4, after receiving the signal, the processed signal is identified by means of demodulation and decoding according to an agile signal of carrier synchronization, bit synchronization, and frame synchronization characteristics, and finally the information transmitted from the other party is obtained.

8. The channel width agile and secure communication method according to claim 1, wherein when the channel width is fixed, the change of the agile spectrum with time is zero, so the channel agile technology is fully compatible with existing fixed channel communication technologies.

* * * * *